US007333916B2

(12) United States Patent
Warfield et al.

(10) Patent No.: US 7,333,916 B2
(45) Date of Patent: Feb. 19, 2008

(54) PERFORMANCE MONITOR FOR A PHOTOVOLTAIC SUPPLY

(75) Inventors: Donald B. Warfield, Woodbine, MD (US); Paul Garvison, Frederick, MD (US)

(73) Assignee: BP Corporation North America Inc., Warrenville, IL (US)

( * ) Notice: Subject to any disclaimer, the term of this patent is extended or adjusted under 35 U.S.C. 154(b) by 180 days.

(21) Appl. No.: 10/549,975

(22) PCT Filed: Apr. 2, 2004

(86) PCT No.: PCT/US2004/010208

§ 371 (c)(1),
(2), (4) Date: Sep. 20, 2005

(87) PCT Pub. No.: WO2004/090559

PCT Pub. Date: Oct. 21, 2004

(65) Prior Publication Data

US 2006/0085167 A1    Apr. 20, 2006

Related U.S. Application Data

(60) Provisional application No. 60/460,502, filed on Apr. 4, 2003.

(51) Int. Cl.
*G06F 15/00* (2006.01)
(52) U.S. Cl. .................................. 702/182
(58) Field of Classification Search ................. 702/182
See application file for complete search history.

(56) References Cited

U.S. PATENT DOCUMENTS 3,737,905 A * 6/1973 Haroules et al. ............ 342/351

6,590,150 B1 * 7/2003 Kiefer ........................ 136/258

OTHER PUBLICATIONS

Rosentahl et al., Low cost AC power monitor for residential PV support.,May 2002,Photovoltais Specialist Conference, 2002, COnference Record of the Twent Ninth IEEE,pp. 1473-1475.*
Krauter et al., Satellite monitoring system for remote PV systems., May 2002,Photovoltais Specialist Conference, 2002, COnference Record of the Twent Ninth IEEE,pp. 1714-1717.*
Heilscher G et al Commission Of The European Communities: "Intense Measurement And Evaluation Programme Within The 1000—Roofs—Photovoltaic Programme sponsored by the German Federal Ministry of Research and Technologie (BMFT)" 11th . E.C. Photovoltaic Solar Energy Conference, Montreux, Oct. 12-16, 1992, Proceedings of the International Photovoltaic Solar Energy Conference, Chur, Harwood Academic, Ch. vol. CONF. 11, Oct. 12, 1992 pp. 1489-1490, XP001137868, ISBN: 3-7186-5380-X the whole document.

(Continued)

*Primary Examiner*—John Barlow
*Assistant Examiner*—Aditya S. Bhat
(74) *Attorney, Agent, or Firm*—James A. Gabala; Thomas E. Nemo

(57) ABSTRACT

A method and apparatus is disclosed for monitoring the performance of a solar powered electrical supply where the supply comprises an array of photovoltaic cells that are mounted on a building. In one embodiment, the apparatus comprises: a device for producing a signal representative of solar irradiance; circuitry for computing a running performance signal by using at least the irradiance signal and a measure of the electrical power supplied to the load from the array; a radio for broadcasting the performance signal; and a portable unit for receiving the performance signal from the radio and for visually displaying the performance signal, power production, and electrical utility usage.

59 Claims, 5 Drawing Sheets

OTHER PUBLICATIONS

Bergmann W et al Commission Of The European Communities: "Austrian 200 kWp Photovoltaic Rooftop Programme Accompanying Scientific Monitoring Programme" 13th . E.C. Photovoltaic Solar Energy Conference. Nice, France, Oct. 23, vol. vol. 1 of 2. Conf. 13, Oct. 23, 1995, pp. 672-674, XP001137362, ISBN: 0-9521452-7-8 the whole document.

He W et al Commission Of The European Communities: "Southhampton Photovoltaic Test And Reference Facility" 14th . E.C. Photovltaic Solar Energy Conference. Barcelona, Spain, Jun. 30-Jul. 4, 1997, Proceedings Of The International Photovoltaic Solar Energy Conference, Bedford: H.C. Stephens & Associates, GB. vol. vol. 2 of 2. CONF. 14, Jun. 30, 1997, pp. 1620-1623, XP001136383, ISBN: 1-901675-03-5. the whole document.

Stefanakos E K et al: "Monitoring Of A Hybrid Photovoltaic System For Telecommunications" 2nd World Conference On Photovoltaic Solar Energy Conversion. 15th European PV Solar Energy Conferenc. 27th US IEEE Photovoltaics Specialists Conference. 10th Asia/Pacific PV Science And Engineering Conference. Vienna, Austria, Jul. 6-10, 1998, vol. vol. 3, 1998, pp. 3078-3081, XP001138646, ISBN: 92-828-5420-5, the whole document.

Quaida B et al Institute Of Electrical And Electronics Engineers: "Sunpac: The Remote Monitoring Of Photovoltaic Installations Sunpac: Le Telesuivi Des Installations Photovoltaiques" International Telecommunications Energy Conference. (Intelec). Paris, Sep. 27-30, 1993, New Yor, IEEE, US, vol. vol. 1 Conf. 15 Sep. 27, 1993, pp. 303-306, XP000496159, the whole document.

Patent Abstracts of Japan, vol. 1998, No. 12, Oct. 31, 1998, & JP 10 201106 A (Yokogawa M & amp; C KK), Jul. 31, 1998 abstract; figure 1 paragraph 0022—paragraph 0023.

Kuipers U et al "Auswertung Von Messwerten Elner Netzkegoppelten Photovoltaikanalage" Elektrotechnische Zeitschrift—Etz. Vde Vertag GMBH. Berlin, DE, vol. 114, No. 23/24, Dec. 1, 1993, pp. 1444-1446, 1448, XP000423829, ISSN: 0948-7387, the whole document.

* cited by examiner

PERFORMANCE MONITOR FOR A PHOTOVOLTAIC SUPPLY

CROSS-REFERENCE TO RELATED APPLICATIONS

This is a Patent Application claiming the priority of a USA Provisional Patent Application filed on Apr. 4, 2003 under Ser. No. 60/460,502 and entitled "PV Performance Monitor."

STATEMENT REGARDING FEDERALLY—SPONSORED RESEARCH OR DEVELOPMENT

Not applicable

REFERENCE TO A "MICROFICHE APPENDIX

Not applicable

TECHNICAL FIELD

This invention relates to the general subject of methods and apparatus for converting sunlight into electricity, and, in particular, to methods and apparatus used to display the performance of a photovoltaic power supply.

BACKGROUND OF THE INVENTION

The photovoltaic (PV) module is the basic building block of PV electrical systems. A PV module is composed of interconnected cells that are encapsulated between a glass cover and weatherproof backing. The modules are typically framed in aluminum frames suitable for mounting. The term "solar panel" is often used to refer to a PV module. However, the same expression is also used in reference to solar water heating systems, so to avoid confusion, "photovoltaic module" is preferred.

The factors that affect the output of a solar power system should be understood so that a user has realistic expectations of overall system output and economic benefits under variable weather conditions over time. The amount of useful electricity generated by a PV module is directly generated to the intensity of light energy, which falls onto the conversion area. So, the greater the available solar resource, the greater is the electricity generation potential. The tropics, for instance, offer a better resource for generating electricity than is available at high latitudes. It also follows that a PV system will not generate electricity at night, and it is important that modules are not shaded. If electricity is required outside daylight hours, or if extended periods of bad weather are anticipated, some form of storage system is essential.

Material

Among other things, the performance of a PV module depends on the cell material. The conversion efficiency of amorphous silicon modules varies from 6 to 8%. Modules of multi-crystalline silicon cells have a conversion efficiency of about 15%. Mono-crystalline silicon modules are the most efficient; their conversion efficiency is about 16%. Typical sizes of modules are 0.5×1.0 m2 and 0.33×1.33 m2, made up of about 36 PV cells.

Standard Test Conditions

Solar modules produce DC electricity. The DC output of solar modules is rated by manufacturers under Standard Test Conditions (STC). These conditions are easily recreated in a factory, and allow for consistent comparisons of products, but need to be modified to estimate output under common outdoor operating conditions. STC conditions are: solar cell temperature=25° C.; solar irradiance (intensity)=1000 W/m$^2$ (often referred to as peak sunlight intensity, comparable to clear summer noon time intensity); and solar spectrum as filtered by passing through 1.5 thickness of atmosphere (ASTM Standard Spectrum). A manufacturer may rate a particular solar module output at 100 Watts of power under STC, and call the product a "100-watt solar module." This module will often have a production tolerance of +/−5% of the rating, which means that the module can produce 95 Watts and still be called a "100-watt module." To be conservative, it is best to use the low end of the power output spectrum as a starting point (95 Watts for a 100-watt module). FIG. 1 is a graphical presentation of the current versus the voltage (I-V curve) from a photovoltaic cell as the load is increased from the short circuit (no load) condition to the open circuit (maximum voltage) condition. The shape of the curve characterizes cell performance; this can be called "factory performance" or performance of a PV cell under ideal conditions.

Spectrum

The electrical current generated by photovoltaic devices is also influenced by the spectral distribution (spectrum) of sunlight. It is also commonly understood that the spectral distribution of sunlight varies during the day, being "redder" at sunrise and sunset and "bluer" at noon. The magnitude of the influence that the changing spectrum has on performance can vary significantly, depending on the photovoltaic technology being considered. In any case, spectral variation introduces a systematic influence on performance that is time-of-day dependent. Similarly, the optical characteristics of photovoltaic modules or pyranometer can result in a systematic influence on their performance related to the solar angle-of-incidence.

Temperature

Module output power reduces as module temperature increases. When operating on a roof, a solar module will heat up substantially, reaching inner temperatures of 50 to 75 C degrees. For crystalline modules, a typical temperature reduction factor recommended by the CEC is 89% or 0.89. Therefore, the "100-watt" module will typically operate at about 85 Watts (95 Watts×0.89=85 Watts) in the middle of a spring or fall day, under full sunlight conditions. To ensure that PV modules do not overheat, it is essential that they be mounted in such a way as to allow air to move freely around them. This is a particularly important consideration in locations that are prone to extremely hot midday temperatures. The ideal PV generating conditions are cold, bright, sunny days.

Dirt and Dust

Dirt and dust can accumulate on the solar module surface, blocking some of the sunlight and reducing output. Much of California has a rainy season and a dry season. Although typical dirt and dust is cleaned off during every rainy season, it is more realistic to estimate system output taking into account the reduction due to dust buildup in the dry season. A typical annual dust reduction factor to use is 93% or 0.93. Therefore, the "100-watt module," operating with some accumulated dust may operate, on average, at about 79 Watts (85 Watts×0.93=79 Watts).

Mismatch and Wiring Losses

The maximum power output of the total PV array is always less than the sum of the maximum output of the individual modules. This difference is a result of slight inconsistencies in performance from one module to the next, and is called "module mismatch" and can amount to at least a 2% loss in system power. Power is also lost to resistance in the system wiring. These losses should be kept to a minimum but it is often difficult to keep these losses below 3% for the system. A reasonable reduction factor for these losses is 95% or 0.95.

DC to AC Conversion Losses

The DC power generated by the solar module must be converted into common household AC power using an inverter. Some power is lost in the conversion process, and there are additional losses in the wires from the rooftop array down to the inverter and out to the house panel. Modern inverters commonly used in residential PV power systems have peak efficiencies of 92% to 94% indicated by their manufacturers, but these again are measured under well-controlled factory conditions. Actual field conditions usually result in overall DC-to-AC conversion efficiencies of about 88% to 92%, with 90% or 0.90 a reasonable compromise. So the "100-watt module" output, reduced by production tolerance, heat, dust, wiring, AC conversion, and other losses should translate into about 68 Watts of AC power delivered to the house panel during the middle of a clear day (100 Watts×0.95×0.89×0.93×0.95×0.90=67 Watts).

Estimating System Energy Output

In order to capture as solar energy as possible, the photovoltaic cell must be oriented towards the sun. If the photovoltaic cells have a fixed position, their orientation with respect to the south (northern hemisphere), and tilt angle, with respect to the horizontal plane, should be optimized. The optimum tilt angle lies within a range of approximately 15 degrees of the site latitude. For grid-connected PV systems in Western Europe, for instance, the optimum tilt angle is about 35 degrees. For regions nearer to the equator, this tilt angle will be smaller, and for regions nearer to the poles, it will be larger. A deviation of the tilt angle of 30 degrees from the optimum angle, will lead to less than 10% loss of the maximum yield. During the course of a day, the angle of sunlight striking the solar module will change, which will affect the power output. The output from the "100-watt module" will rise from zero gradually during dawn hours, and increase with the sun angle to its peak output at midday, and then gradually decrease into the afternoon and back down to zero at night. While this variation is due in part to the changing intensity of the sun, the changing sun angle (relative to the modules) also has an effect The pitch of the roof will affect the sun angle on the module surface, as will the East-West orientation of the roof. These effects are summarized in Table 1, which shows that an array on a 7:12-pitch roof facing due South in Southern California gives, for example, the greatest output (correction factor of 1.00), while an East facing roof at that same pitch would yield about 84% of the annual energy of the South facing roof (a correction factor of 0.84 from Table 1).

TABLE 1

Orientation Factors for Various Roof Pitches and Directions

|  | Flat | 4:12 | 7:12 | 12:12 | 21:12 | Vertical |
| --- | --- | --- | --- | --- | --- | --- |
| South | 0.89 | 0.97 | 1.00 | 0.97 | 0.89 | 0.58 |
| SSE, SSW | 0.89 | 0.97 | 0.99 | 0.96 | 0.88 | 0.59 |
| SE, SW | 0.89 | 0.95 | 0.96 | 0.93 | 0.85 | 0.60 |
| ESE, WSW | 0.89 | 0.92 | 0.91 | 0.87 | 0.79 | 0.57 |
| E, W | 0.89 | 0.88 | 0.84 | 0.78 | 0.70 | 0.52 |

TABLE 2

Annual Energy Production by City per kW STC array rating

| CITY | kWh/kWstc (range) |
| --- | --- |
| Arcata | 1092-1365 |
| Shasta | 1345-1681 |
| San Francisco | 1379-1724 |
| Sacramento | 1455-1819 |
| Fresno | 1505-1881 |
| Santa Maria | 1422-1778 |
| Barstow | 1646-2058 |
| Los Angeles | 1406-1758 |
| San Diego | 1406-1758 |

Table 2 is intended to give a conservative estimate of the annual energy expected from a typical PV system, taking into account the various factors discussed above. These values are for annual kWh produced from a 1 -kilowatt (1 kW) STC DC array, as a simple and easy guide.

EXAMPLE

A 4 kW WSTC solar array (as specified under STC conditions) located in the Los Angeles area at a 4:12 pitch and facing southeast should produce at least 5343 kWh of electric energy annually (1406 kWh/kW×0.95×4 kW=5343 kWh). The typical residential customer in that area uses about 7300 kWh annually, meaning such a PV system could produce at least 75% of the total energy needed by such a typical home. Moreover, if energy efficiency measures were taken by the owner to reduce the overall electrical consumption of the home, the percentage could approach 100%. Note that the low end of the range was used to calculate the actual savings. It is wise to be conservative when making performance claims.

Maximum power output of most properly installed PV systems occurs near midday on sunny days in the spring and fall. If the owner fully understands this characteristic, they will not be disappointed with unavoidable low output in the middle of the winter. Metering is a way of proving to the owner that the equipment is properly installed. Often, the owner's primary indication of whether they feel the system is operating properly or not is their monthly electric bill. If the owner suddenly begins using more electricity, they may not see much decrease in their bill and assume the PV system is under-performing. Metering can help avoid disputes between the installer and the owner by showing that the system performs as advertised. One of the attractive attributes of PV system is low maintenance. However, even electrical systems need to be maintained from time to time. With proper metering, an informed owner can easily determine if their system is operating properly or not.

Previous methods (see FIG. 1) of checking the module and system performance often relied on "correcting back" from as-measured power to STC, usually by: using linear coefficients of $dI_{sc}/dT$, $dV_{oc}/dT$ and $dP_{max}/dT$, and assuming a linear dependency on light level. However, when PV arrays are installed and used: during low light level periods (e.g. winter time), or during extreme temperatures, or during high solar incidence angles, then it is difficult to correct back to STC for the modules, as errors are largest when the biggest corrections in temperature and irradiance are made. It also has been difficult to check if the array was set up and performing as expected.

This problem has existed for some time. Considerable effort has been made, and significant amounts of money have been expended, to resolve this problem. In spite of this, the problem still exists. Actually, the problem has become aggravated with the passage of time because solar power systems are becoming more common and are being owned by consumers who do not know subtle solar engineering design factors.

SUMMARY OF THE INVENTION

In accordance with the present invention, a method and apparatus is disclosed for monitoring the performance of a solar powered electrical supply for an electrical load wherein the supply comprises an array of photovoltaic cells that are mounted on a building and that have a predetermined performance. In one embodiment, the apparatus comprises: an irradiance sensor for producing a signal representative of solar irradiance; a circuit for deriving a running performance signal by using at least the irradiance signal and a measure of the electrical power supplied to the load from the array; a radio for broadcasting the performance signal; and a portable unit for receiving the performance signal from the radio and for visually displaying the performance of the solar electrical system.

In one embodiment, the portable unit comprises a plurality of indicators, including: solar irradiance, temperature, time, photovoltaic power production, photovoltaic power relative to utility provided electrical power, photovoltaic power on a time scale, total photovoltaic power production, daily power production, power production relative to utility power consumption, and daily solar production relative to maximum possible production.

The invention analyses electrical grid connected PV system performance in real time to see if it is working correctly. In the event of a performance-limiting fault, it can send a signal to notify the user.

In another embodiment, the array is characterized by an outdoor temperature and the circuitry derives a running performance signal by using the irradiance signal, the predetermined performance rating of the array; and the measure of the electrical power supplied to the load from the array.

The invention provides an improved and efficient method and apparatus for owners of solar power systems to understand what is happening and how their system is performing. Numerous other advantages and features of the present invention will become readily apparent from the following detailed description of the invention, the embodiments described therein, from the claims, and from the accompanying drawings.

DETAILED DESCRIPTION

Figure 1:
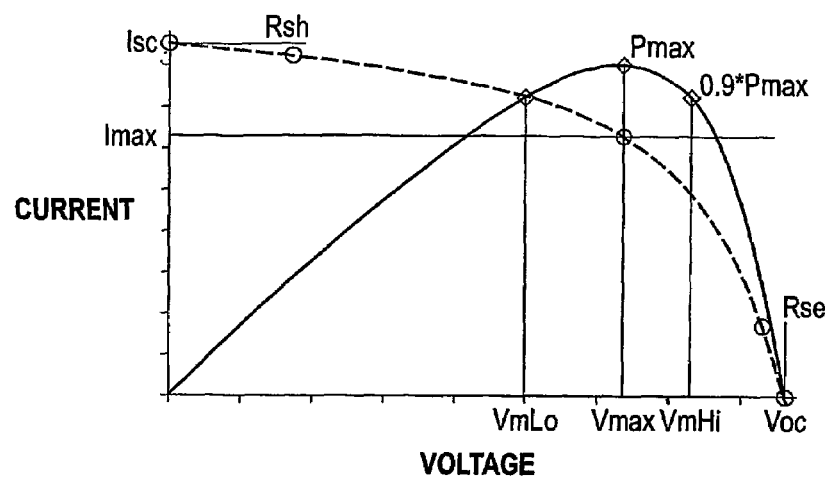
FIG. 1 is a graphical depiction of current versus voltage from a PV cell as load is increased.

While this invention is susceptible of embodiment in many different forms, there is shown in the drawings, and will herein be described in detail, several specific embodiments of the invention. It should be understood, however, that the present disclosure is to be considered an exemplification of the principles of the invention and is not intended to limit the invention to any specific embodiment so described.

Before describing the invention in detail, the environment of the invention will be explained.

Typical System Components

Figure 2:
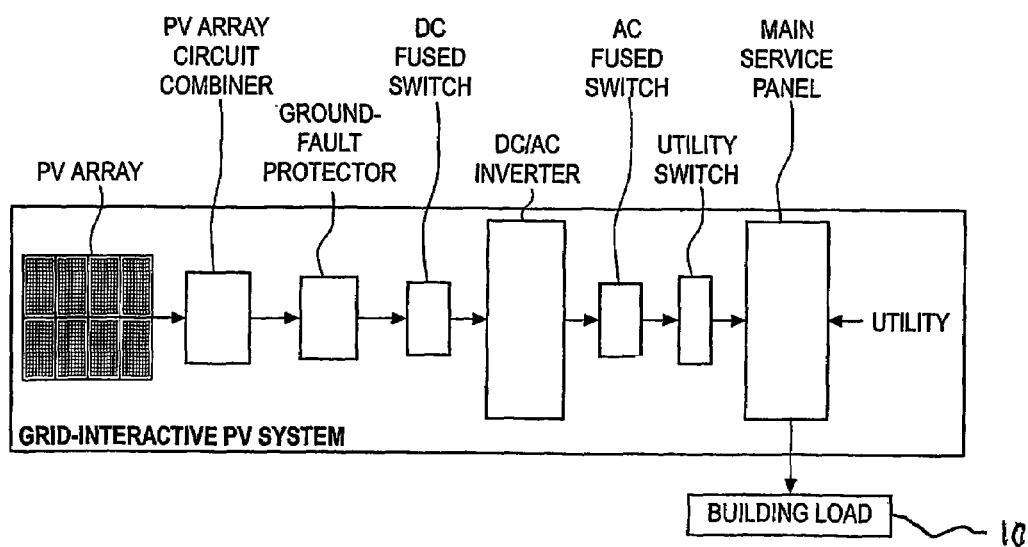
FIG. 2 is a block diagram of a typical solar electrical power system.

A typical solar electrical power system (see FIG. 2) comprises: a PV Array, Balance of System Equipment, a DC to AC Inverter, and other components.

PV Array: Common PV modules are 5 to 25 square feet in size and weigh about 3 to 4 lbs./ft$^2$. Often sets of four or more smaller modules are framed or attached together by struts in what is called a panel. This panel is typically around 20 to 35 square feet in area for ease of handling on a roof. This allows some assembly and wiring functions to be completed on the ground if called for by the installation instructions.

DC-AC inverter: This is a device that takes the DC power from the PV array and converts it into standard AC power used by the house appliances.

Balance of System Equipment (BOS): This refers to the mounting systems and wiring systems used to integrate the solar modules into the structural and electrical systems of the home. The wiring systems include disconnects for the DC and AC sides of the inverter, ground-fault protection, and over current protection for the solar modules. Most systems include a combiner board of some kind since most modules require fusing for each module source circuit. Some inverters include this fusing and combining function within the inverter enclosure.

Other Components: This may be dependent on the local utility and may include a utility switch.

Overview

This invention, "PV-Verifier" or "PV$^2$", defines a new way of checking the PV array performance:
to help get the highest kWh out of a system,
to maximise the usefulness, and
to reduce the cost per kWh.

Figure 4:
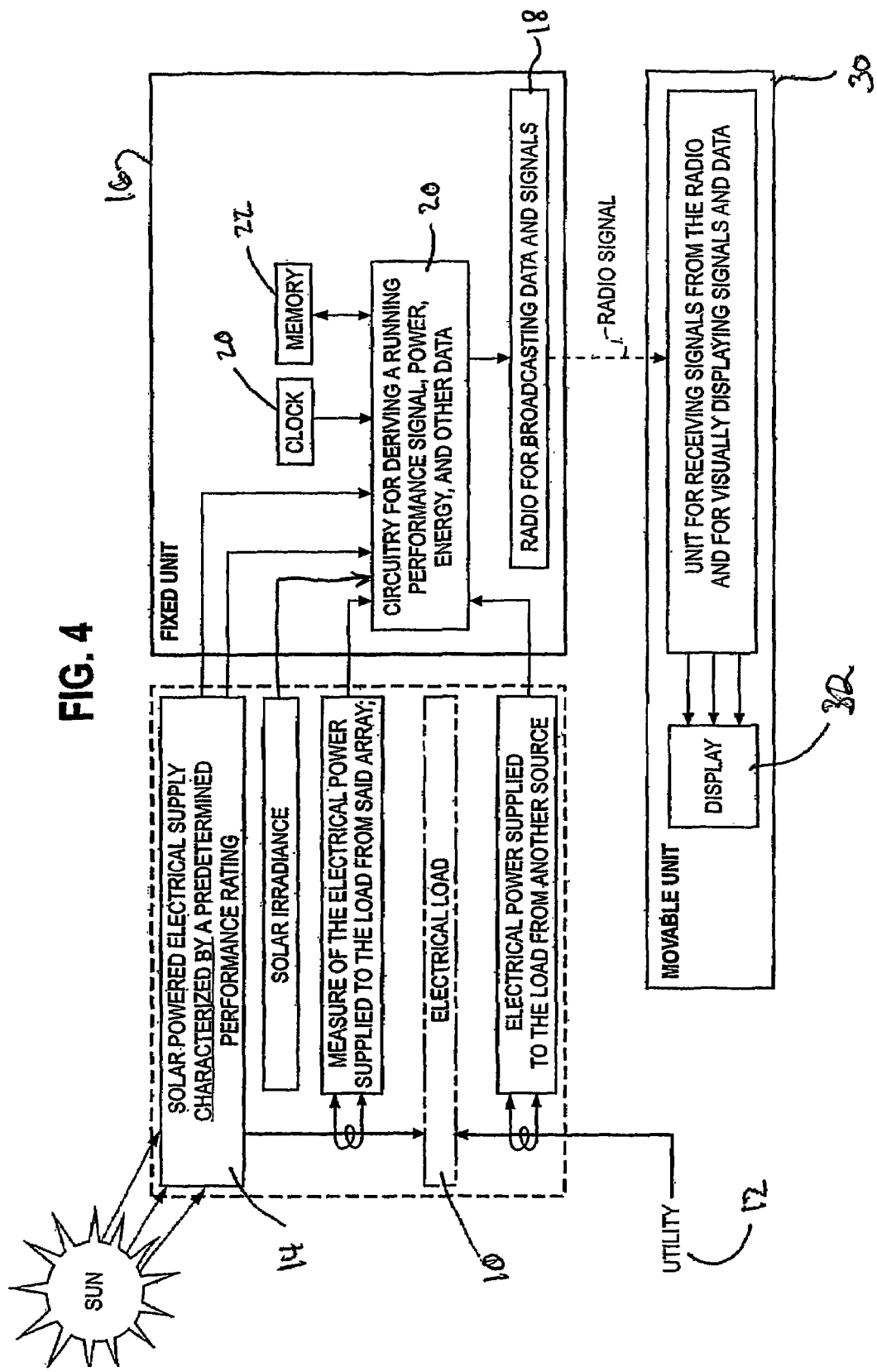
FIGS. 4 and 5 are block diagrams of the components of two embodiments of the present invention.

The invention is intended to monitor and display PV system performance. The present invention consists of two discrete units, interfaced by radio-frequency (RF) link:

A Data Collection Unit 16 performs data measurement, processing, storage, and transmission via RF link to the Data Display Unit. Turning to FIG. 4, the data flow of the invention is depicted. The electrical load 10 of a building or other structure has electrical power provided to it from an external source 12 (e.g., an electrical utility, generator, battery, etc.) and from a solar PV power supply 14. The Data Collection Unit 16 takes signals and information (e.g., from the power supply 14, the other power sources 12, factory performance characteristics of the array, etc.) and processes/converts that information into a format for broadcast by a relatively short-range radio 18. Circuitry for obtaining voltage, current, and power, and sending that information in a form suitable for further processing and transmission are known to those skilled in the art. The fixed Data Collection Unit 16 also includes signal processing circuitry 20, memory 22, clock 24 and an internal power supply (i.e., a battery, not shown for simplicity).

The Data Display Unit 30 visually depicts information transmitted to it from the Data Collection Unit. The Data Display Unit 30 receives information broadcast from the radio 18 and converts that information into a format for visual display 32 (See FIGS. 3, 6, and 7). The portable Data Display Unit 30 also includes an internal power supply (i.e., a battery, not shown for simplicity).

The RF interface is designed to function reliably through exterior and/or interior walls of the residence and at distances limited by the restrictions imposed by the FCC and the physical composition of the individual building or structure.

The Data Collection Unit 16 and the Data Display Unit 30 will now be described in greater detail.

Data Collection Unit

This unit 16 has these functions:

Measures true AC power out of PV system. Typically, 120V electrical service uses one current transducer located in electrical utility service entrance enclosure.

Measures true AC power into and out of home at the service entrance. Standard 200 amp (A), Edison 3-wire 240 Vac residential utility service typically requires two current transducers.

Measures solar irradiation using an analog sensor located by the solar PV array.

Measures ambient temperature using a temperature sensor housed in an enclosure near the PV array.

Preferably, the sampling rate is consistent with refresh rate on Display Unit. A voltage transducer is used for power measurement (i.e., monitor either line-to-line 240 Vac or one 120 Vac leg). Current transducers for home power measurement may be the "split type" for ease of installation.

The Data Collection Unit 16 may be provided with a RS-232 port to facilitate setup/calibration. Depending on available memory, averaged data may be stored several times each hour. Preferably, on-board memory retains data up to 30 days, the data is time and date stamped, and calibration, data and clock settings are stored in non-volatile memory.

Preferably the Data Collection Unit 16 is designed to function without an on-board modem. The unit may be provided with space and functionality if a modem is subsequently installed (i.e., adoption of modem feature without redesign of product, by providing a socket in base design). If used, these matters may be considered:

Data is identified by site code.

Dials out daily to a pre-set number or ISP for upload of data to host database.

Desired dial out schedule is set by host.

Modem and data transmission speed are consistent with a short transmission time.

Dial out transmission should drop out if homeowner picks up telephone to make call.

Dropped-out transmissions should be re-attempted after dial tone is detected.

Data storage in the event of phone problems or other interruptions.

Unit clock is reset by host during dial out transmission.

Preferably, the specifications on the Data Collection Unit 16 would include:

outdoor rated, and non-metallic.

appearance is consistent with other residential service entrance enclosures.

corrosion resistant finish consistent with long life in outdoor environment.

mechanical configuration permits all power measurement inputs and unit power to be routed from household service entrance through a single conduit.

tamper resistant.

internal components are protected from condensation and/or internal heat generation.

inverter independent.

temperature and irradiance inputs that are routed from roof via a multi-conductor cable and a cable gland.

optional phone cable for option modem is routed via cable gland.

power to operate the unit is supplied from AC source in utility service entrance; function may be combined with voltage transducer required for power measurement.

operates over the expected range of temperatures of the geographic area.

operates over the expected range of relative humidity of the geographic area.

inputs are protected against electrical/lightning-induced surges.

antenna is otherwise protected from mechanical damage.

contains battery-backed real-time clock/calendar that has high lifetime accuracy and that is settable without opening enclosure.

Display Unit

The Data Display Unit 30 receives data wirelessly from the Data Collection Unit 16. The wireless feature can be achieved by using conventional radio frequencies, cellphone frequencies, wireless networking, Bluetooth® wireless technology, text messaging and optical infrared. Preferably, the unit has these features:

No visible antenna.

Portable.

Installs in the interior of the building (e.g., hangs on the wall).

Battery power (no external wire connections) expected minimum battery lifetime of at least several months.

No user accessible switches or controls.

Figure 3:
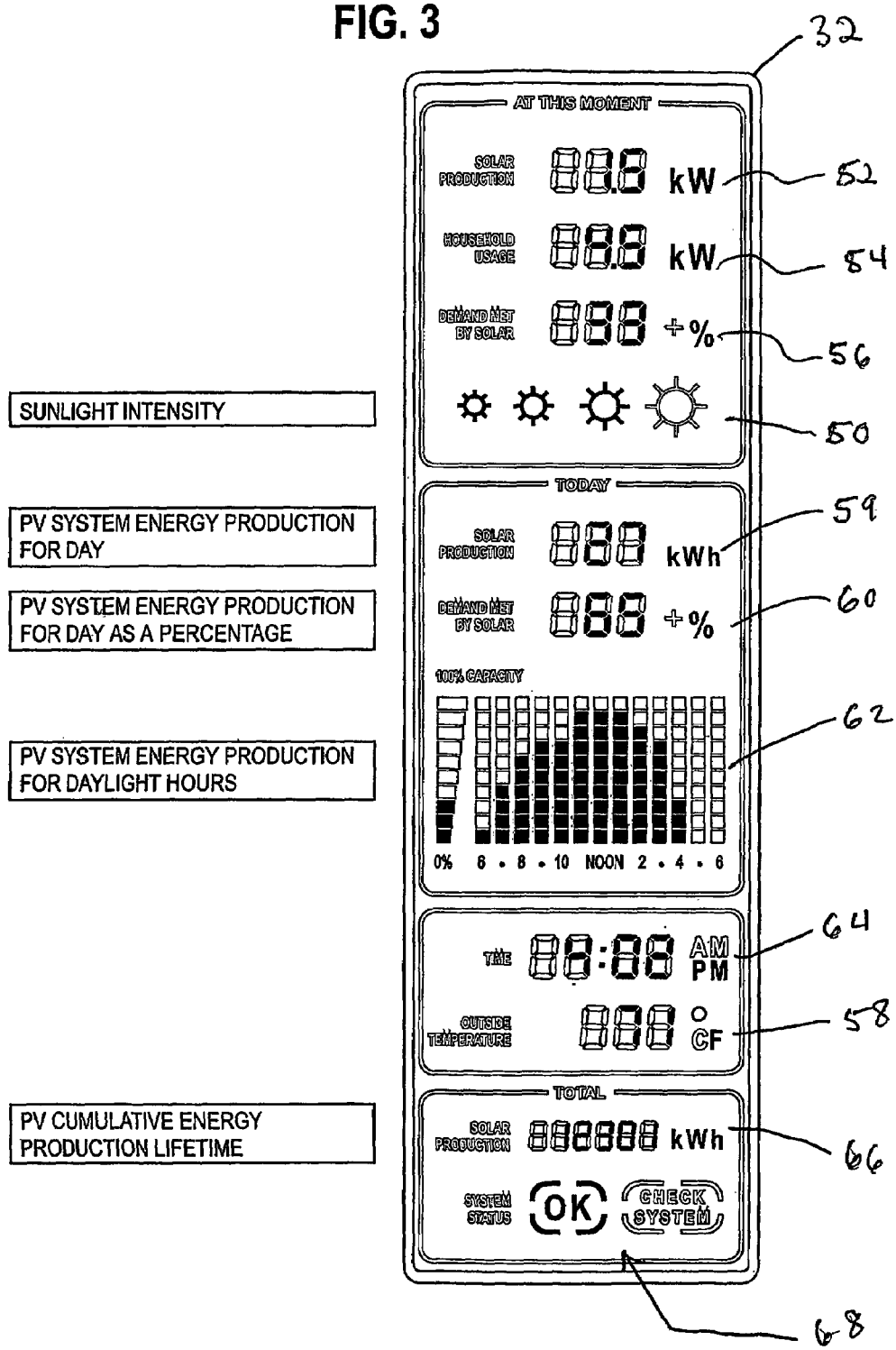
FIG. 3 is a schematic diagram of the Data Display Unit that is part of the subject invention.
Figure 6:
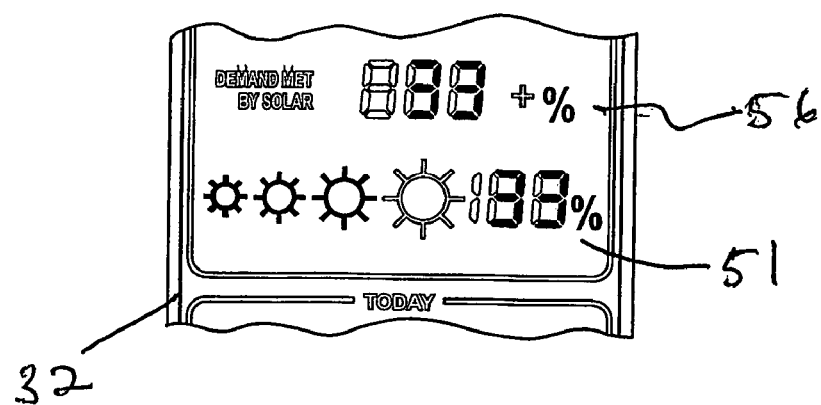
FIG. 6 is an alternative display of solar irradiance display of FIG. 3.

Display layout per FIG. 3 and/or FIG. 6.

Figure 7:
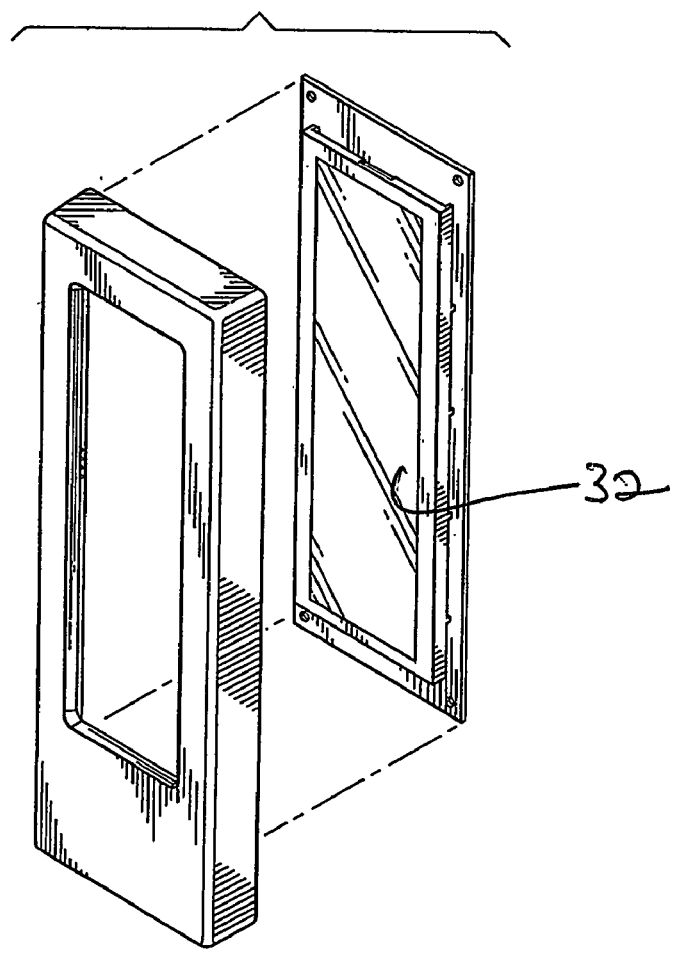
FIG. 7 is a partial assembly drawing of the Data Display Unit showing the bezel and liquid crystal display board coming together.

Injection-molded enclosure (see FIG. 7).

Frequent refresh interval.

Viewable display dimensions about 2"×7".

Preferably, the Data Display Unit 30 includes "Sunlight Intensity Icons" 50. This is a display of solar irradiance. It is the approximate intensity of the sunlight at the array. As shown in the drawings, four different sized "suns" arrayed left to right, smallest to largest, with intensity as a percentage to the far right:

- 0% to 15% blank;
- 15% to 25% $1^{st}$ sun (smallest);
- 25% to 50% $2^{nd}$ sun;
- 50% to 75% $3^{rd}$ sun; and
- 75% to 100% $4^{th}$ sun (largest or highest irradiance).

No "suns" are displayed at night or on overcast days and all suns are shown at full sunlight intensity. FIG. 6 is an alternative display for solar irradiance. Here solar irradiance is displayed as a percentage of maximum 51 and in the form of "sun icons."

Data Processing, Storage and Transmission

Data transmission to Data Display Unit 30 is performed wirelessly. Referring to FIG. 3, the data displayed would include:

Solar Production: This is a display 52 of the amount of power (kW) the solar electric system is currently producing.

Household Usage: This is a display 54 of the amount of power (kW) the residence is using right now (i.e., sum of PV service and electrical utility service entrance measurements), Demand Met by Solar: This is a display 56 of the percentage of the home's electricity that is generated by the solar electric system, Outdoor temperature: This is a display 58 in deg F or deg C (preferably, software settable), Daily Solar Production: This is a display 59 amount of energy (kWh) the solar electric system produced over the current calendar day, Daily Demand Met by Solar: This is a display 60 of the percentage of electrical energy consumed (i.e., household consumption) since 12:01 AM for the current day and produced by the solar electric system. It starts at 0% immediately after midnight and increase as the day progresses. When the sun sets, this value will decrease while power is used in the home, Capacity Bar Graph: This is a graphic representation 62 of today's solar electricity production hour-by-hour. In this embodiment the day's energy production is graphed from 6 AM until 6 PM. It helps the user know energy was produced during the day, Time: This is a display 64 of local time in AM/PM or 24 hr (preferably, software settable, Total Solar Production: This is a display 66 of the cumulative energy (kWh) produced by the solar electric system since it was installed., System Status: If the Data Display Unit 32 is outside transmission range the Data Collection Unit 16, or solar power production is lower than expected, "check system" light 68 will appear. Normally a system "OK" will be displayed. The objective is to detect if the output of electricity from the PV power supply is consistent with the output expected when the intensity of the sun (irradiance) is considered.

General Preferences

Preferably, in the United States, the equipment would have these features:
  Underwriters Laboratory (UL) listed or recognized.
  Meets FCC requirements.
  Design tested and/or evaluated for proper operation in a household environment with no interference with other household electronic devices.
  Installed in compliance with local electric codes.
  Designed and constructed to have a long life.
  Free from defects in material, workmanship, and function from the date of purchase.

Operation and Performance

On start-up, the $PV_2$ reads, from memory: values of PV parameters (See FIG. 1), such as: Pmax.stc (and if available), Vmax.stc, and Imax.stc), and system constants, such as:

the percentage (i.e., 50%) of calculated power the system must achieve in order to pass the system status test, and the minimum signal (i.e., radio wireless) strength that must be received by the display unit to provide reliable operation, and the threshold light intensity below which the pass/fail criteria will not be checked).

Next, it loads typical empirical coefficients for determining the likely array output as a function of instantaneous Irradiance. The maximum expected clear sky irradiance on the array can be inferred from $T_{ambient}$, clock time, latitude and longitude of the array, and array orientation (azimuth and tilt). If the Vdc and Idc are known, then these can be checked against input limits and empirical equations to make sure the system is tracking properly. If the irradiance is above a pre-defined threshold, then the system calculates the expected output power from an empirical equation. Alternatively, and more simply, an instantaneous Irradiance signal can be used alone to compare against the measured power out of the solar array, and if the difference between measured power and the expected output exceeds a predetermined amount (e.g., 50%) the System Status light 68 would be lighted. This would show that the array is not properly performing, or that the radio signal from the Data Collection Unit 16 to the Data Display Unit 32 is too weak for reliable data transfer.

The following is an example of the coding to perform this assessment:

```
// Define constants
Pmax = 10 // kWp
A = 0.8
B = 0.1
C = -0.0045
E = 1
Fail = 0.5 // you need at least this to pass
Dark = 0.2 // suns
Fails_in_a_row = 5
// Every measurement
Get Gi // solar irradiance
Get Tam // ambient temperature
Get Pac // measured AC power output Pac
Ycalc = Gi * (A + B*Gi + C*Tam) - E
//Check Gi, Tam, Pac are valid
If Gi > Dark
    If Pac/Pmax < Ycalc * Fail then
        Fails++
            Passes = 0
            If Fails >> Fails_in_a_row then SYSTEM DOWN
    else
        Passes++
            Fails = 0
            If Passes >> Fails_in_a_row then SYSTEM BACK ON
```

This occupies just a couple of kB of code. C*Tam can be interpreted as a thermal de-rating factor (e.g., −0.5%/deg C.). "A" is a linear parameter that dominates the computation (e.g., about 0.8 to 1.0). "B" is a non-linear parameter.

"E" is a term representing a constant loss. Adding a term for wind speed can further refine performance prediction.

Figure 5:
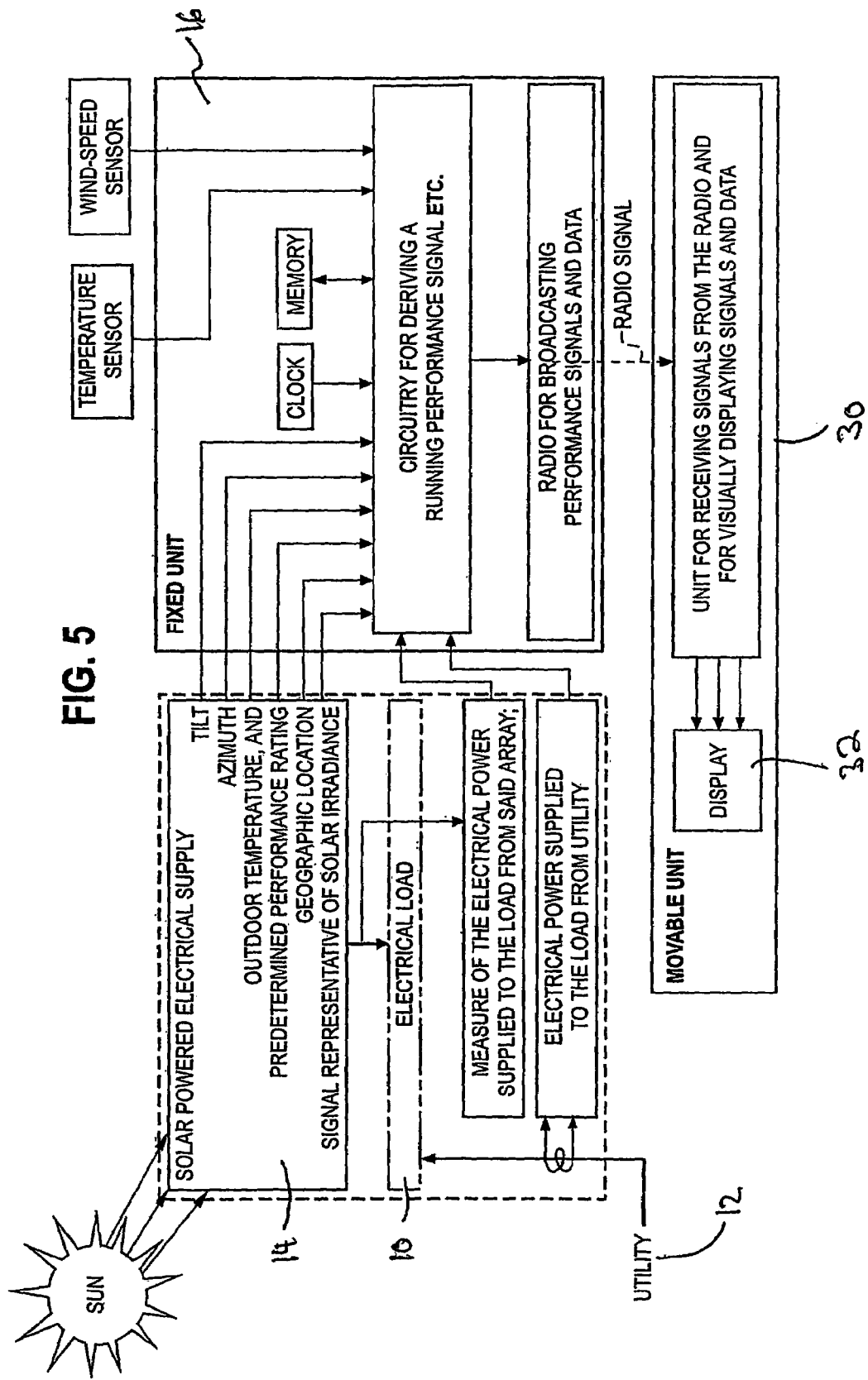

From the foregoing description, it will be observed that numerous variations, alternatives, and modifications will be apparent to those skilled in the art. Accordingly, this description is to be construed as illustrative only and is for the purpose of teaching those skilled in the art the manner of carrying out the invention. Various changes may be made in the shape, materials, size and arrangement of parts. For example, a generally rectangular tall display is shown in FIG. 3; a generally horizontal display may be used as well. Moreover, equivalent elements may be substituted for those illustrated and described. Parts may be reversed and certain features of the invention may be used independently of other features of the invention. As another example, the more complex functional block diagram of FIG. 5 may be used. In that illustration, the geometry of the array (i.e., tilt and azimuth) as well as the geographic location of the array and irradiance are taken into consideration in deriving a signal representative of the expected output of the solar power supply. As yet another example, the clock in the fixed unit may drift away from true time and not be correctly set to solar time. The shape of the daily irradiance curve may be used to calculate solar dawn, noon, and dusk. These values can be stored in memory and compared to when dusk, noon and dawn are predicted based on an ephemeris located in memory. When appropriate, the clock can be adjusted to solar time. Alternately, one could use an "atomic clock" tuned to a central observatory. One could also store daily sums of irradiance, ambient temperature and AC power output. That would only take a kB or so of memory and then build up daily performances, like above, without worrying about low light levels, etc. Once you have enough data, you could do some linear regression/curve fitting. Linear regression should not take too much memory. As a final example, you could also store a day of 15-minute data and a month of daily sum data. You could multiply everything by 100 and store as integers to reduce code and memory requirements. The system could also be set up to calculate daily averages and send these to a central site, or to store monthly averages to enable data interrogation via modem line. The effect of shadowing or problems such as inverter start-up in the morning can be determined by the system analysing: the shapes of the irradiance (time of day, month) and yield (time of day, month) arrays. If the system had been working, then a predefined succession of failures will flag an error signal that will be sent to an engineer. Similarly if the array comes back on line then a succession of pass measurements will cause a pass signal to be sent. The invention provides the model from actual measured data. One can start out by using the data from a system that uses similar hardware for validation, but you can soon switch to using past data from the system itself to check performance. Thus, it will be appreciated that various modifications, alternatives, variations, and changes may be made without departing from the spirit and scope of the invention as defined in the appended claims. For example, although the invention is described in a solar context, the basic principles are applicable to other forms of alternative electrical supply systems (e.g., wind power and microhydro) that augment electrical utilities. It is, of course, intended to cover by the appended claims all such modifications involved within the scope of the claims.

We claim:

1. In a building that has an electrical load and that carries a solar powered electrical supply comprising an array of photovoltaic cells having a predetermined factory performance rating, apparatus comprising:

(a) irradiance means, in solar communication with the array, for producing a signal representative of solar irradiance;
   (b) a circuit, carried by the building and having a clock, for computing a running performance signal by using at least the predetermined performance rating, and said irradiance signal, and a measure of the electrical power supplied to the load from the array;
   (c) a radio for broadcasting said performance signal, and,
   (d) a portable unit for receiving said performance signal from said radio and for visually displaying said performance signal.

2. The apparatus of claim 1, wherein said solar powered electrical supply is characterized by an outdoor temperature; and wherein said circuit computes said running performance signal by using said irradiance signal, the predetermined performance rating, and outdoor temperature.

3. The apparatus of claim 1, wherein said running performance signal is a function of the difference between a pre-determined number, and a number whose value is derived from a signal representing solar irradiance.

4. The apparatus of claim 3, where said difference is greater than 50%.

5. The apparatus of claim 3, wherein said portable unit emits light when said difference is greater than a predetermined amount during the time when sunlight is expected.

6. The apparatus of claim 5, wherein said light is emitted by a liquid crystal display.

7. The apparatus of claim 1, wherein said irradiance means comprises a solar cell having a predetermined electrical output as a function of its temperature; wherein said irradiance signal is transmitted by said radio; and wherein said portable unit comprises a lighted display that is a function of said irradiance signal.

8. The apparatus of claim 1, wherein said running performance signal is a function of the difference between: (a) a signal representative of electrical power supplied to the load from the array; and (b) a signal representative of a calculation of the electrical power the array should produce as a function of time, said predetermined factory photovoltaic performance rating, and irradiance.

9. The apparatus of claim 1, wherein said irradiance means is selected from the group consisting of silicon photodiode, a pyranometer, and a photoelectric cell.

10. The apparatus of claim 1, wherein said running performance signal is a function of; (a) the difference between electrical power supplied to the load from the array and what electrical power said array should produce as a function of current time, said predetermined factory photovoltaic performance rating, and said irradiance, and (b) a predetermined maximum difference signal.

11. The apparatus of claim 1, where said performance signal is visually displayed on said portable unit by means of liquid crystal display that indicates if said difference is less than or equal a predetermined amount.

12. The apparatus of claim 1, wherein said performance signal is computed at least every 15 minutes during day time.

13. The apparatus of claim 1, wherein said running performance signal is a function of the difference between a number whose value is derived from a signal. (original) representing electrical power supplied to the load from the array, and a number whose value is derived from a signal representing solar irradiance and a signal representing ambient temperature.

14. The apparatus of claim 1, wherein said running performance signal is a function of a number whose value is derived from a signal representing solar irradiance and a signal representing ambient temperature.

15. The apparatus of claim 1, wherein said radio broadcasts a power signal representative of said measure of the electrical power supplied to the load from the array; and further including a display, operating in response to said power signal and located on said portable unit, of electrical power from the array.

16. The apparatus of claim 15, wherein said load is connected to an electrical service supply; further including means for providing a measure of the electrical power supplied to said load by said service supply; and wherein said radio broadcasts said measure of electrical power supplied to said load by said service supply; and further including a display on said portable unit of electrical power consumed by the load from said electrical service.

17. The apparatus of claim 16, wherein said circuit derives the percentage of power consumed by the load and provided by the array relative to power consumed by the load and provided by said electrical service.

18. The apparatus of claim 17, wherein said electrical power provided by the array is displayed as a function of time.

19. The apparatus of claim 17, wherein said electrical power provided by the array is depicted as total watt-hours consumed.

20. The apparatus of claim 19, wherein electrical power provided by the array is depicted as a percent of maximum array capacity.

21. The apparatus of claim 17, wherein said electrical power provided by the array is depicted as total watt-hours produced during the current day.

22. The apparatus of claim 1, wherein said radio broadcasts said irradiance signal, and said portable unit displays a solar irradiance.

23. The apparatus of claim 22, wherein said display of solar irradiance is a depiction of the percent of measured solar irradiance relative to maximum solar irradiance.

24. The apparatus of claim 22, wherein said display of solar irradiance is depicted by N icons, where "N" is a whole number, and where each icon represents about (100%)/N of maximum solar irradiance.

25. Apparatus, comprising:
  (a) a fixed unit that is adapted to be carried by a building to which an electrical utility supplies electricity to a load, said building having a roof carrying photovoltaic cells supplying electricity to the load, and an outdoor temperature, said unit being adapted to receive a first signal that is representative of electrical power consumed by said load and provided by the utility, a signal that is representative of photovoltaic electrical power consumed by said load, a first signal that is representative of said outdoor temperature, a second signal that is representative of solar irradiance on said roof, and a time signal that is representative of time; a circuit within said unit using at least said first and said second representative signals and, time to derive a signal that is representative of expected power output of said photovoltaic cells, said unit including a relatively short range radio for broadcasting information that is representative of at least said derived signal: and
  (b) a movable unit for receiving information broadcasted from said radio and for visually displaying at least a representation of photovoltaic power consumption and a representation of said derived signal.

26. The apparatus of claim 25, wherein said movable unit includes a display of the photovoltaic power relative to utility provided electrical power, and said display operates in response to information broadcast by said radio.

27. The apparatus of claim 25, wherein said movable unit includes a display of photovoltaic power on a time scale, wherein said radio broadcast information is a function of said solar irradiance.

28. The apparatus of claim 27, wherein said movable unit includes a display of solar irradiance that is a function of time.

29. A monitor for a structure that has a photovoltaic electrical supply on its exterior, that is adapted to receive a primary electrical supply, that has an electrical load adapted to be connected to the primary power supply and to the photovoltaic power supply, and that has an exterior temperature, comprising:
  (a) a stationary unit comprising;
    (i) photovoltaic means, operatively connected to the photovoltaic electrical supply, for producing a signal representative of photovoltaic power consumed by the load;
    (ii) irradiance means, located on the exterior of the structure, for producing a signal representative of solar irradiance relative to the photovoltaic electrical supply;
    (iii) circuitry, receiving signals representative of the outdoor temperature, solar irradiance and time, for repeatedly producing a signal representative of the expected photovoltaic electrical power output;
    (iv) a circuit for producing an output signal that is a function of the difference between said expected photovoltaic electrical power output and actual photovoltaic electrical power consumption; and
    (v) a radio to broadcast information that is a function of photovoltaic electrical power output, said irradiance signal and said output signal; and
  (b) a movable unit for receiving said information from said radio means and for visually displaying photovoltaic electrical power consumption, solar irradiance, and said output signal.

30. The monitor of claim 29, wherein said stationary unit receives a signal representative of the primary power consumption and sends it to said radio means; and wherein said movable unit displays primary power consumption in digital form.

31. The monitor of claim 29, wherein said movable unit displays in digital form photovoltaic power consumption as a function of time.

32. The monitor of claim 29, wherein said movable unit displays as a step function photovoltaic power consumption.

33. The monitor of claim 29, wherein time is provided to said computation means by a clock; and wherein said circuitry includes a memory for storing signals representative of the photovoltaic electrical power consumption, outdoor temperature, said output signal, and time from said clock.

34. The monitor of claim 29, wherein said radio receives said signal representative of outdoor temperature, and said movable unit displays outdoor temperature.

35. The monitor of claim 29, wherein said radio receives a signal representative of primary power consumption, and said movable unit displays primary power consumption.

36. The monitor of claim 29, wherein said movable unit displays in digital form primary power consumption, said photovoltaic power output; and photovoltaic power output as a function of time.

37. The monitor of claim 29, wherein said irradiance means comprises a solar cell.

38. An energy monitor adapted for use in home having an electrical load and a roof that carries a solar electrical power supply, comprising:
   (a) first power means, connected to the home's solar electrical power supply, for producing signals representative of power consumed by the load from said solar electrical power supply;
   (b) irradiance means for producing a signal representative of solar irradiance;
   (c) circuitry, utilizing time and said signal representative of power consumed by the load from said solar power supply and said solar irradiance signal, for producing an output signal representative of the efficiency of said solar electrical power supply;
   (d) a radio transmitter for broadcasting information representative of the signals produced by said first power means and said circuitry; and
   (e) a portable display, spaced apart from said radio transmitter, for receiving information from said radio transmitter and for visually displaying generated power consumption, solar power consumption, solar irradiance, and a measure of said efficiency of said solar power supply.

39. The energy monitor of claim 38, further including second power means connected to the homes utility service for producing, as an output, signals representative of power consumed by the load from said utility service.

40. The energy monitor of claim 39, wherein said signals representative of power consumed by the load from said utility service are sent to said radio transmitter and received by said portable display for display thereon.

41. The energy monitor of claim 40, wherein said circuitry and said radio transmitter are housed together.

42. The energy monitor of claim 41, wherein said circuitry comprises a clock providing digital time signals; and memory, operatively connected to said clock to store said output signal and solar electrical power consumption signals in the form of a time log.

43. The energy monitor of claim 42, wherein the solar electrical power supply comprises an array of photovoltaic cells characterized by a factory performance rating; and wherein said circuitry produces said output signal as a function of said factory performance rating.

44. In a habitat that is carried by a platform orbiting a star, that has a photovoltaic electrical power supply on its exterior that has a source of primary electrical power supply; that has an electrical load adapted to be connected to the primary power supply and to the photovoltaic power supply, and that has an exterior temperature, apparatus, comprising:
   (a) a fixed unit that is adapted to receive:
      (i) a signal representative of photovoltaic electrical power consumed by the load,
      (ii) a signal representative of solar irradiance for the photovoltaic electrical power supply, and
      (iii) a signal from a clock that is representative of time, said fixed unit comprising a radio for transmitting information that is a function of signals (i) through (iii) and a signal that is representative of the expected performance of the photovoltaic electrical power supply and that is derived at least from signals (i) through (iii); and (b) a receiver that is substantially movable for receiving said information from said radio and for visually displaying representations of time, photovoltaic electrical power consumption, and said performance signal.

45. The apparatus of claim 44, wherein said photovoltaic power supply comprises an array of photovoltaic cells; and further including means, located in the vicinity of said array for providing a signal representative of solar irradiance.

46. The apparatus of claim 44, further including a visual display carried by the receiver, and a signal comparator carried by the receiver and operatively connected to the visual display such that if the radio signal from the base unit drops below a predetermined signal strength, said visual display is energized.

47. In a building that has an electrical load and that carries a solar powered electrical supply comprising an array of photovoltaic cells for producing electrical power to the load, apparatus comprising:
   (a) a first power sensor, operatively connected to the output of the solar powered electrical supply, for producing a signal representative of the electrical power being produced from the array;
   (b) a radio, operatively connected to said first power sensor, for broadcasting a signal that is representative of said power signal;
   (c) a portable unit for receiving said power signal from said radio and for visually displaying a representation of the electrical power being produced from the array; and
   (d) an irradiance sensor, in solar communication with the array, for producing a signal representative of solar irradiance, wherein said radio is operatively connected to said irradiance sensor to broadcast said signal that is a function of said irradiance signal; and wherein said portable unit comprises means for receiving said irradiance signal from said radio and for visually displaying solar irradiance.

48. The apparatus of claim 47, wherein said array has a predetermined performance rating; and further including:
   (e) a circuit, carried by the building, for deriving a running performance signal by using at least the predetermined performance rating of the array and said irradiance signal and said signal representative of the electrical power being produced; wherein said radio is operatively connected to said circuit to broadcast said performance signal; and wherein said portable unit comprises means for receiving said performance signal from said radio and for visually displaying said performance signal.

49. The apparatus of claim 47, wherein said irradiance signal is displayed by using at least two intensity icons, both of which are lighted when the irradiance signal is maximum, none of which are lighted when the irradiance signal is below a first predetermined minimum, and one of which is lighted when said irradiance signal is at least equal to a second predetermined minimum.

50. The apparatus of claim 47, wherein the load in the building is connected to an external electrical supply; and further including:
   (e) a second power sensor, operatively connected to said external electrical supply, for producing a signal representative of the electrical power supplied to the building; and
   (f) a circuit, connected to said first power sensor and to said second power sensor, for deriving a signal that is representative of the total electrical power the building is using, wherein said radio is operatively connected to said circuit to broadcast a signal that is a function of the total electrical power the building is using; and wherein said portable unit comprises means for receiving said total electrical power signal from said radio and for visually displaying said total electrical power the building is using.

51. The apparatus of claim 47, wherein the load in the building is connected to an external electrical supply further including:
(e) a second power sensor operatively connected to said external electrical supply, for producing a signal representative of the electrical power supplied to the building; and
(f) a circuit, connected to said first power sensor and to said second power sensor, for deriving a signal that is representative of the percentage of the total electrical power the building is using that is provided by the array, wherein said radio is operatively connected to said circuit to broadcast a signal that is a function of said percentage of the total electrical power the building is using that is provided by the array; and wherein said portable unit comprises means for receiving said percentage of the total electrical power signal from said radio and for visually displaying said percentage of the total electrical power that is provided by the array.

52. The apparatus of claim 47, further including:
(e) a clock;
(f) memory; and
(g) a circuit operatively connected to said clock and said first power sensor for storing in memory a representation of the amount of energy (kWh) the solar array produced over a calendar day, wherein said radio is operatively connected to said memory to broadcast a signal that is a function of said daily solar power production; and wherein said portable unit comprises means for receiving said daily solar power production signal from said radio and for visually displaying said daily solar power production.

53. The apparatus of claim 47, wherein the load in the building is connected to an external electrical supply, further including:
(e) a clock;
(f) memory;
(g) a second power sensor, operatively connected to said external electrical supply, for producing a signal representative of the electrical power supplied to the building; and
(h) a circuit, connected to said first power sensor, to said clock and to said second power sensor, for storing in memory a representation of the percentage of the total electrical energy the building is using that is provided by the array over one day, wherein said radio is operatively connected to said circuit to broadcast a signal that is a function of said percentage of the total electrical energy the building is using that is provided by the array each day; and wherein said portable unit comprises means for receiving said daily percentage of the total electrical energy signal from said radio and for visually displaying said daily percentage of the total electrical energy that is provided by the array.

54. The apparatus of claim 47, further including:
(e) a clock, and
(f) memory, wherein said signal representative of the electrical power being produced from the array is periodically sent into said memory and aggregated in response to said clock; wherein said radio is operatively connected to said memory to broadcast said aggregated electrical power signal; and wherein said portable unit comprises a means for receiving said aggregated electrical power signal, and a graphic representation of a day's solar electricity production as a function of time.

55. The apparatus of claim 54, wherein said graphic representation of a day's solar electricity production is hourly for at least a portion of a day.

56. The apparatus of claim 47, further including:
(e) a clock, and
(f) memory, wherein said signal representative of the electrical power being produced from the array is periodically sent into said memory and aggregated in response to said clock; wherein said radio is operatively connected to said memory to broadcast said aggregated electrical power signals; and wherein said portable unit comprises a means for receiving said aggregated electrical power signal, and a display of solar electricity production over a plurality of days.

57. The apparatus of claim 56, wherein said a display of solar electricity production over a plurality of days shows the cumulative energy (kWh) produced by the solar electric system since it was installed.

58. In a building that has an electrical load connected to an external electrical supply, and that carries a solar powered electrical supply comprising an array of photovoltaic cells for producing electrical power to the load, apparatus comprising:
(a) a first power sensor, operatively connected to the output of the solar powered electrical supply, for producing a signal representative of the electrical power being produced from the array to the load;
(b) a second power sensor, operatively connected to the external electrical supply, for producing a signal representative of the electrical power supplied to the load from the external electrical supply;
(c) an irradiance sensor, in solar communication with the array, for producing a signal representative of solar irradiance;
(d) a first circuit, operatively connected to said first power sensor, for deriving a running performance signal by using at least said irradiance signal and said signal representative of the electrical power being produced;
(e) a second circuit, operatively connected to said first power sensor and to said second power sensor, for deriving a signal that is representative of the percentage of the total electrical power the building is using that is provided by the array;
(f) a radio, operatively connected to said first circuit and to said second circuit, to broadcast a signal that is representative of the percentage of the total electrical power that the building is using and that is provided by the array, and to broadcast said performance signal; and
(g) a movable unit for receiving signals from said radio, and visually displaying the percentage of the total electrical power that the building is using and that is provided by the array, and for visually displaying said performance signal.

59. In a building that has an electrical load connected to an external electrical supply, and that carries a solar powered electrical supply comprising an array of photovoltaic cells for producing electrical power to the load, apparatus comprising:
(a) a first power sensor, operatively connected to the output of the solar powered electrical supply, for producing a signal representative of the electrical power being supplied to the load from the array;

(b) a second power sensor, operatively connected to said external electrical supply, for producing a signal representative of the electrical power supplied to the load;
(c) an irradiance sensor, in solar communication with the array, for producing a signal representative of solar irradiance;
(d) a performance circuit for deriving a running performance signal by using at least said irradiance signal and said signal representative of the electrical power being produced from the array;
(e) a clock;
(f) memory;
(g) a computation circuit, operatively connected to said first power sensor, to said clock and to said second power sensor, for storing in memory data that represents the percentage of the total electrical energy supplied to the load that is provided by the array over one day,
(h) a radio, operatively connected to said performance circuit and to said memory, to broadcast signals that are representative of said data stored in memory and said performance signal; and
(i) a movable unit for receiving signals from said radio, and visually displaying said daily percentage of the total electrical energy that is provided by the array, and said running performance.

* * * * *